United States Patent
Yokoi

(10) Patent No.: US 11,072,325 B2
(45) Date of Patent: Jul. 27, 2021

(54) DRIVE ASSIST DEVICE, DRIVE ASSIST METHOD AND NON-TRANSITORY COMPUTER READABLE STORAGE MEDIUM FOR STORING PROGRAMS THEREOF

(71) Applicant: DENSO CORPORATION, Kariya (JP)

(72) Inventor: Yusuke Yokoi, Kariya (JP)

(73) Assignee: DENSO CORPORATION, Kariya (JP)

( * ) Notice: Subject to any disclaimer, the term of this patent is extended or adjusted under 35 U.S.C. 154(b) by 197 days.

(21) Appl. No.: 16/357,747

(22) Filed: Mar. 19, 2019

(65) Prior Publication Data

US 2019/0291725 A1 Sep. 26, 2019

(30) Foreign Application Priority Data

Mar. 23, 2018 (JP) .............................. JP2018-055410

(51) Int. Cl.
| | |
|---|---|
| *B60W 30/09* | (2012.01) |
| *B60Q 9/00* | (2006.01) |
| *B60W 30/085* | (2012.01) |
| *G06K 9/00* | (2006.01) |
| *B60W 30/095* | (2012.01) |

(52) U.S. Cl.
CPC .......... *B60W 30/09* (2013.01); *B60W 30/085* (2013.01); *B60W 30/0956* (2013.01); *G06K 9/00825* (2013.01); *B60W 2554/801* (2020.02)

(58) Field of Classification Search
CPC ....... B60W 30/09; B60W 50/14; B60R 21/01; G09G 5/003; G01S 13/867; B62D 15/02
See application file for complete search history.

(56) References Cited

U.S. PATENT DOCUMENTS

| 5,710,565 A | * | 1/1998 | Shirai | ...................... B62D 1/28 342/70 |
|---|---|---|---|---|
| 2013/0207832 A1 | | 8/2013 | Mizutani et al. | |
| 2015/0183431 A1 | * | 7/2015 | Nanami | .................. B60R 21/01 701/301 |
| 2017/0153644 A1 | * | 6/2017 | Otsuka | .................. B60W 50/14 |
| 2017/0225617 A1 | * | 8/2017 | Morimura | .............. G09G 5/003 |
| 2018/0162392 A1 | * | 6/2018 | Takaki | .................. G01S 13/867 |

FOREIGN PATENT DOCUMENTS

| DE | 102005036714 A1 | * | 2/2007 | ............. B62D 15/02 |
|---|---|---|---|---|
| JP | 2013-164391 A | | 8/2013 | |
| JP | 5835490 B2 | | 12/2015 | |

* cited by examiner

*Primary Examiner* — Yuri Kan
(74) *Attorney, Agent, or Firm* — Maschoff Brennan

(57) ABSTRACT

In a drive assist device, a detection result acquiring part acquires detection results of a sensor which detects a presence of other vehicle travelling ahead of an own vehicle on a driving lane. A range estimation part estimates a width direction range of a surface of other vehicle. A safe operation control part performs safe operation of the own vehicle at least one of avoiding occurrence of collision with other vehicle and of reducing collision damage when a predetermined operating condition is satisfied. A condition setting part adjusts the predetermined operating condition to another operating condition of being stricter than the predetermined operating condition to suppress a degree of execution of the safe operation of the own vehicle when other vehicle is presence outside the width direction range, as compared with that when other vehicle is presence within the width direction range.

10 Claims, 4 Drawing Sheets

DRIVE ASSIST DEVICE, DRIVE ASSIST METHOD AND NON-TRANSITORY COMPUTER READABLE STORAGE MEDIUM FOR STORING PROGRAMS THEREOF

CROSS-REFERENCE TO RELATED APPLICATION

This application is related to and claims priority from Japanese Patent Application No. 2018-55410 filed on Mar. 23, 2018, the contents of which are hereby incorporated by reference.

TECHNICAL FIELD

The present disclosure relates to drive assist devices, drive assist methods and non-transitory computer readable storage mediums for storing programs thereof.

BACKGROUND

Various drive assist devices have been widely used, to be mounted on vehicles, so as to assist the driver's operation of an own vehicle. Such a drive assist device receives detection results transmitted from sensors such as a millimeter wave sensor, and calculates a movement vector composed of a relative location of the own vehicle with respect to detected objects, for example, a preceding vehicle which travelling ahead of the own vehicle, and a relative speed of the own vehicle with respect to the preceding vehicle on the basis of the received detection results of objects. The drive assist device calculates a collision probability of whether the own vehicle will collide with the preceding vehicle. When the calculated collision probability exceeds a predetermined threshold value, the drive assist device performs safe control which instructs a brake assembly mechanism to reduce a moving speed of the own vehicle so as to keep the safe driving of the own vehicle.

SUMMARY

An exemplary embodiment of the present disclosure provides a drive assist device. In the drive assist device, a detection result acquiring part acquiring detection results of a sensor which detects a presence of other vehicle travelling ahead of an own vehicle on a driving lane. A range estimation part estimates a width direction range of a surface of the other vehicle, facing the own vehicle side on the basis of the acquired detection results of the sensor. A safe operation control part performs safe operation of the own vehicle of at least one of avoiding occurrence of collision with the other vehicle and of reducing collision damage when a predetermined operating condition is satisfied. A condition setting part adjusts the predetermined operating condition to the other operating condition of being stricter than the predetermined operating condition to suppress a degree of execution of safe operation of the own vehicle when a position of the other vehicle detected by the sensor is outside the width direction range as compared with a degree of execution of the safe operation of the own vehicle when the position of the other vehicle detected by the sensor is within the width direction range.

BRIEF DESCRIPTION OF THE DRAWINGS

A preferred, non-limiting embodiment of the present disclosure will be described by way of example with reference to the accompanying drawings, in which.

DETAILED DESCRIPTION OF THE PREFERRED EMBODIMENTS

Figure 1:
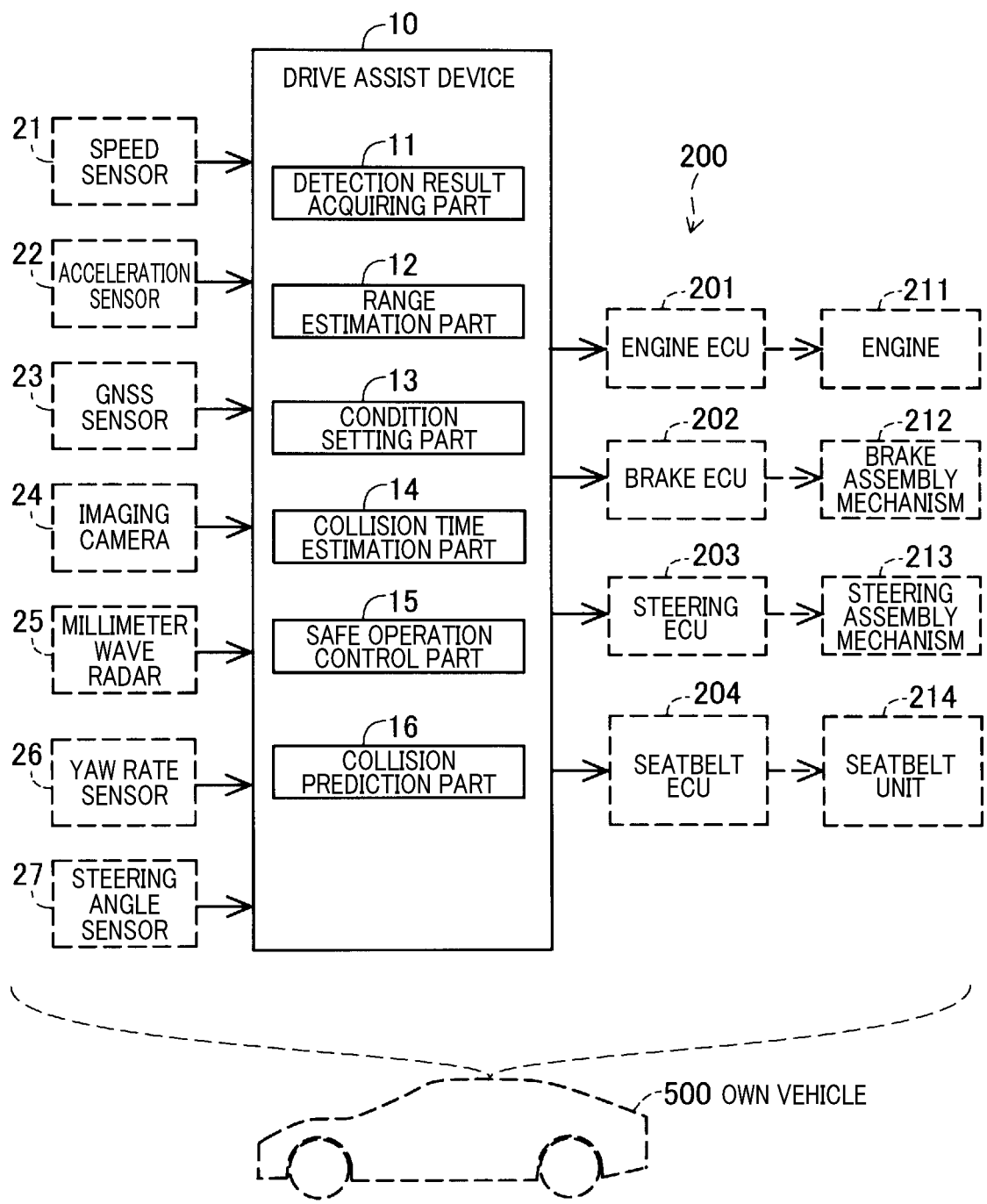
FIG. 1 is a block diagram showing a drive assist device, mounted on an own vehicle, according to exemplary embodiments of the present disclosure.

Hereinafter, various embodiments of the present disclosure will be described with reference to the accompanying drawings. In the following description of the various embodiments, like reference characters or numerals designate like or equivalent component parts throughout the several diagrams.

Exemplary Embodiment

A description will be given of a drive assist device 10, a drive assist method and a non-transitory computer readable storage medium. The non-transitory computer readable storage medium stores programs which provide functions of the drive assist method.

(Structure of the Drive Assist Device 10)

FIG. 1 is a block diagram showing the drive assist device 10 according to exemplary embodiments of the present disclosure. As shown in FIG. 1, the drive assist device 10 is mounted on an own vehicle 500. As will be explained later, a preceding vehicle VL1 travelling ahead of the own vehicle 500 on a driving lane or a roadway.

The drive assist device 10 performs drive assist of the own vehicle 500. In particular, the drive assist device 10 automatically performs an engine control and a brake control of the own vehicle 500 without driver's instruction. The drive assist device 10 further performs drive assist of the driver of the own vehicle 500.

For example, during the drive assist of the driver of the own vehicle 500, when the driver of the own vehicle 500 turns on a right-hand side turn signal light so as to move the own vehicle 500 toward a right side of the roadway, the drive assist device 10 automatically performs the engine control, the brake control and steering control of the own vehicle 500 so as to move the own vehicle 500 toward the right side.

The drive assist device 10 instructs the own vehicle 500 to perform safe control. This safe control performs at least one of a collision avoidance control between the own vehicle 500 and a detected other vehicle, and a collision damage reduction control to reduce collision damage when predetermined operating conditions are satisfied. The safe control will be explained later.

The drive assist device 10 is composed of an electronic control unit (ECU) having a central processing unit (CPU), a memory unit, etc.

The drive assist device 10 provides various functional parts composed of a detection result acquiring part 11, a range estimation part 12, a condition setting part 13, a collision time estimation part 14, a safe operation control part 15 and a collision prediction part 16. That is, the CPU in the ECU as the drive assist device 10 executes programs stored in the memory unit so as to provide these functional parts composed of the detection result acquiring part 11, the range estimation part 12, the condition setting part 13, the collision time estimation part 14, the safe operation control part 15 and the collision prediction part 16.

The detection result acquiring part 11 receives and acquires detection signals transmitted from various types of sensors mounted on the own vehicle 500. The detection signals represent detection results of these sensors. For example, the own vehicle 500 is equipped with a speed sensor 21, an acceleration sensor 22, a global navigate satellite system sensor (GNSS sensor) 23, an imaging camera 24, a millimeter wave radar 25, a yaw rate sensor 26 and a steering angle sensor 27.

The speed sensor 21 detects a moving speed of the own vehicle 500. The GNSS sensor 23 is composed of a global positioning system sensor (GPS sensor). The GPS sensor receives electromagnetic waves transmitted from a satellite having a GPS, and detects a current location of the own vehicle 500 on the basis of the received electromagnetic waves.

The imaging camera 24 acquires an image of the surroundings of the own vehicle 500 and provides acquired images. It is acceptable to use a monocular camera or to use a stereo camera or multiple cameras composed of not more than two cameras as the imaging camera. The millimeter wave radar 25 transmits millimeter waves and detects the presence of objects around the own vehicle 500. Further, the millimeter wave radar 25 detects an inter-vehicle distance between the own vehicle 500 and a detected object, a location of the detected object, and a relative speed of the own vehicle with respect to the detected object. In more detail, the millimeter wave radar 25 detects objects on the basis of reflected waves which have been reflected by the objects.

The yaw rate sensor 26 detects a yaw rate (rotation angular velocity) of the own vehicle 500. The steering angle sensor 27 detects a steering wheel angle of the own vehicle 500.

The range estimation part 12 estimates a width direction range of the back of a preceding vehicle which is running in front of the own vehicle 500 on the same roadway. The preceding vehicle is an object detected by the millimeter wave radar 25.

The condition setting part 13 determines one or more operating conditions so as to perform safe control of the own vehicle 500. In order to determine the operating conditions, the condition setting part 13 performs an operating condition setting process which will be explained later.

The collision time estimation part 14 estimates a collision time when the own vehicle 500 will collide with the detected preceding vehicle. The estimation method of estimating the collision time will be explained later.

The safe operation control part 15 controls a operation control device 200 mounted on the own vehicle 500 so as to perform the safe control of the own vehicle 500. The operation control device 200 is composed of a plurality of electronic control devices and adjusts the behavior of the own vehicle 500. More specifically, the operation control device 200 is equipped with an engine electronic control device 201 (the engine ECU 201), a brake electronic control device 202 (the brake ECU 202), a steering electronic control device 203 (the steering ECU 203) and a seatbelt electronic control device 204 (the seatbelt ECU 204).

The engine ECU 201 controls behavior of the engine 211 of the own vehicle 500. That is, the engine ECU 201 instructs various types of actuators (not shown) so as to control open/close behavior of a slot valve, ignition control of an ignitor, open/close behavior of an intake valve, etc.

The brake ECU 202 controls behavior of the brake assembly mechanism 212. The brake assembly mechanism 212 is an actuator group composed of sensors, motors, valves, pumps, etc. The brake ECU 202 determines a brake start timing at which the brake assembly mechanism 212 and determines a magnitude of the brake amount. The brake ECU 202 controls the actuator group composed of sensors, motors, valves, pumps, etc. in order to brake the movement of the own vehicle 500 by the determined magnitude at the determined brake start timing.

The steering ECU 203 controls a steering assembly mechanism 213. The steering assembly mechanism 213 is composed of actuator devices such as a power steering motor, etc. The steering ECU 203 determines a steering amount (or a steering angle) on the basis of detection results transmitted from the yaw rate sensor and the steering angle sensor. The steering ECU 203 controls behavior of the steering assembly mechanism 213 on the basis of the determined steering amount.

The seatbelt ECU 204 has seatbelts and seatbelt motors which fasten the respective seatbelts. The seatbelt ECU 204 controls the seatbelt motors so as to roll up the respective seatbelts.

In the exemplary embodiment, the drive assist device 10 performs following safe operations (a) to (f).

(a) The safe operation to close the throttle valves regardless of a depressed amount of the accelerator pedal of the own vehicle;

(b) The safe operation to increase an assist hydraulic pressure of the brake assembly mechanism 212 so as to enhance response characteristics of the driver's brake pedal operation with respect to the brake assembly mechanism 212;

(c) The safe operation to automatically operate the brake assembly mechanism 212 regardless of the depressed amount of the driver's brake pedal operation so as to reduce the speed of (or to stop) the own vehicle 500;

(d) The safe operation to automatically perform the steering operation of the steering assembly mechanism 213 so as to change a moving direction of the own vehicle 500 to avoid a collision with another vehicle;

(e) The safe operation to vibrate the steering wheels so as to provide warning information to the driver of the own vehicle 500; and (f) The safe operation to automatically rollup the seatbelts of a seatbelt unit 214 so as to suppress vehicle occupants from moving from their seats.

The collision prediction part 16 identifies and determines a moving vector of the detected other vehicle on the basis of detection results transmitted from the millimeter wave radar 25, and predicts occurrence of collision of the own vehicle 500 with the detected other vehicle on the basis of the identified moving vector.

(Safe Operation Process)

A description will be given of a safe operation process performed by the drive assist device 10 according to the exemplary embodiment with reference to FIG. 2.

Figure 2:
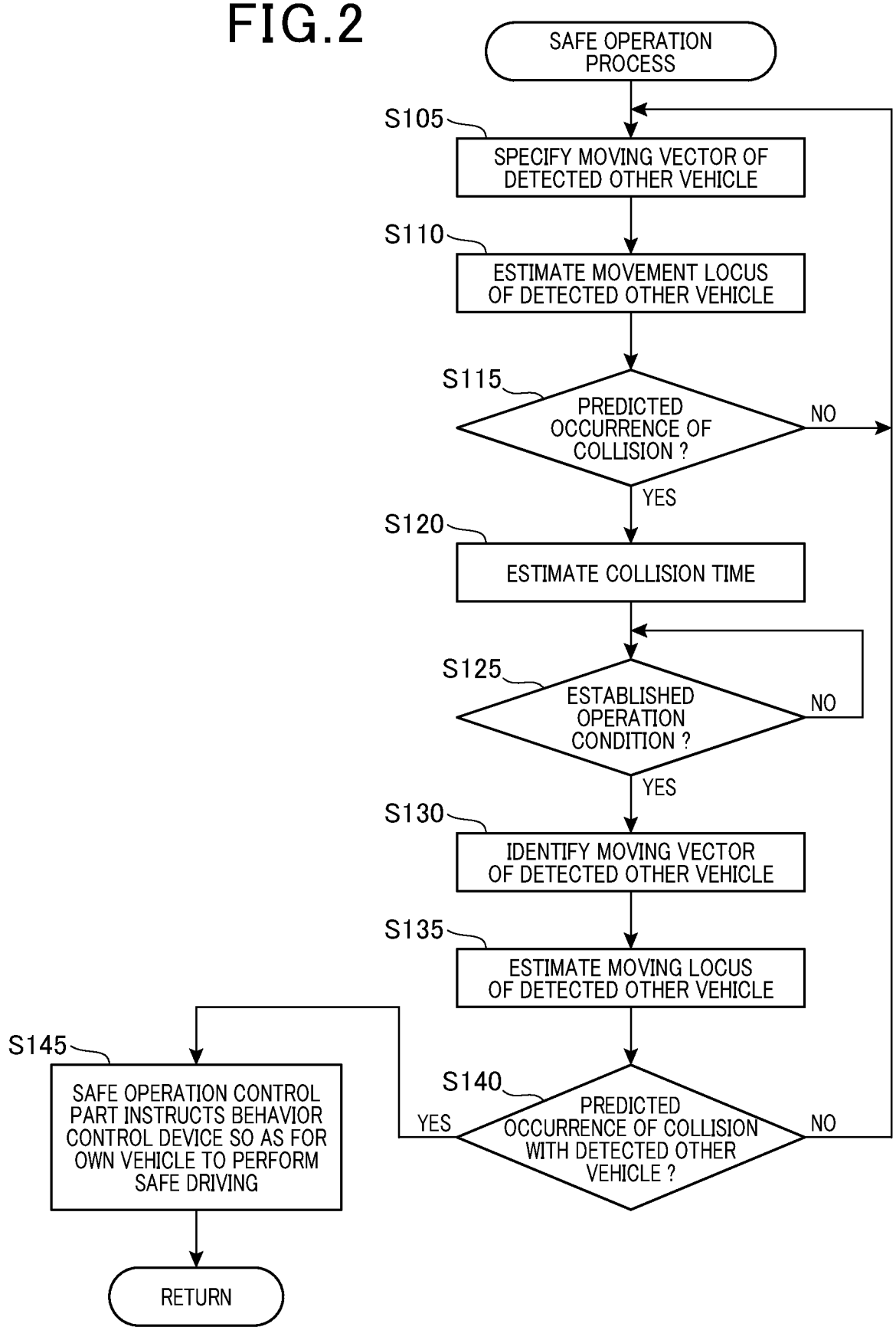
FIG. 2 is a flow chart showing a safe control process performed by the drive assist device shown in FIG. 1.

FIG. 2 is a flow chart showing the safe control process performed by the drive assist device 10 shown in FIG. 1.

The drive assist device 10 performs a safe operation process when the driver of the own vehicle 500 turns on the ignition key of the own vehicle 500 and the electric power is supplied to the drive assist device 10.

As shown in FIG. 2, in step S105, the collision prediction part 16 identifies a moving vector of a detected other vehicle on the basis of the detection results transmitted from the detection result acquiring part 11. For example, the detected vehicle is running ahead of the own vehicle 500.

The moving vector represents a relative speed of the detected vehicle with respect to the own vehicle 500. The relative speed includes a magnitude of the speed of the detected vehicle and a moving direction of the detected vehicle). As will be explained later, the moving vehicle of the detected other vehicle is determined based on a plurality of objects which have been detected in time-series and identified by the millimeter wave radar 25. It is acceptable for the drive assist device 10 to use various methods such as the least squares method, a RANdom SAmple Consensus (RANSAC) method so as to determine the moving vector of the detected other vehicle on the basis of a plurality of points of the detected objects detected in time series. The operation flow progresses to step S110.

In step S110, the collision prediction part 16 predicts a movement locus of the detected other vehicle on the basis of the moving vector of the detected other vehicle identified in step S105. Specifically, the collision prediction part 16 calculates a future movement locus of the detected other vehicle while considering that the moving vector will be maintained. The operation flow progresses to step S115.

In step S115, the collision prediction part 16 detects whether the own vehicle 500 will collide with the detected other vehicle on the basis of the movement locus of the detected other vehicle predicted in step S110, a relative location of the detected other vehicle detected by the millimeter wave radar 25 with respect to the own vehicle 500, and the location of the own vehicle 500 detected by the GNSS sensor 23.

When the detection result indicates negative ("NO" in step S115), i.e. indicates that the own vehicle 500 will not collide with the detected other vehicle, the operation flow returns to step S105.

On the other hand, when the detection result indicates positive ("YES" in step S115), i.e. indicates that the own vehicle 500 will collide with the detected other vehicle, the operation flow progresses to step S120.

In step S120, the collision time estimation part 14 estimates a collision time. That is, the collision time estimation part 14 estimates the collision time on the basis of the moving vector identified in step S105 and the relative location of the detected other vehicle obtained by the millimeter wave radar 25 with respect to the own vehicle 500. The operation flow progresses to step S125.

In step S125, the safe operation control part 15 detects whether the operation condition has been satisfied. The operation condition represents that a predetermined grace time as an initial time value with respect to the estimated collision time has elapsed. It is acceptable for the safe operation control part 15 to adjust the predetermined grace time to a time value which is different from the initial time value on the basis of the operation. For example, the embodiment uses the initial time value of five seconds. It is acceptable for the safe operation control part 15 to use another initial time value of the grace time.

When the detection result indicates positive ("YES" in step S125), i.e. indicates that the operation condition has been satisfied, the operation flow progresses to step S130.

In step S130, the collision prediction part 16 identifies the moving vector of the detected other vehicle again. The operation flow progresses to step S135.

In step S135, the collision prediction part 16 calculates the movement locus of the detected other vehicle again. The operation flow progresses to step S140.

In step S140, the collision prediction part 16 detects again whether the own vehicle 500 will collide with the detected other vehicle. Because the processes in step S130, step S135 and step S140 are similar to the processes in step S105, step S110 and step S115, the detailed explanation of the processes in step S130, step S135 and step S140 is omitted.

When the detection result indicates negative ("NO" in step S140), i.e. indicates that the own vehicle 500 will not collide with the detected other vehicle, the operation flow returns to step S105.

On the other hand, when the detection result indicates positive ("YES" in step S140), i.e. indicates that the own vehicle 500 will collide with the detected other vehicle, the operation flow returns to step S145.

In step S145, the safe operation control part 15 instructs the operation control device 200 so as for the own vehicle 500 to perform safe driving. Specifically, when the grace time is the initial value of 5 seconds and the elapsed time reaches to the time before five seconds from the estimated collision time, the safe operation control part 15 transmits an instruction to the operation control device 200. When receiving the instruction transmitted from the safe operation control part 15, the operation control device 200 performs the safe operations (a) to (f) previously described. The operation flow returns to step S105.

(Operating Condition Setting Process)

A description will be given of the operating condition setting process performed by the drive assist device 10 with reference to FIG. 3.

Figure 3:
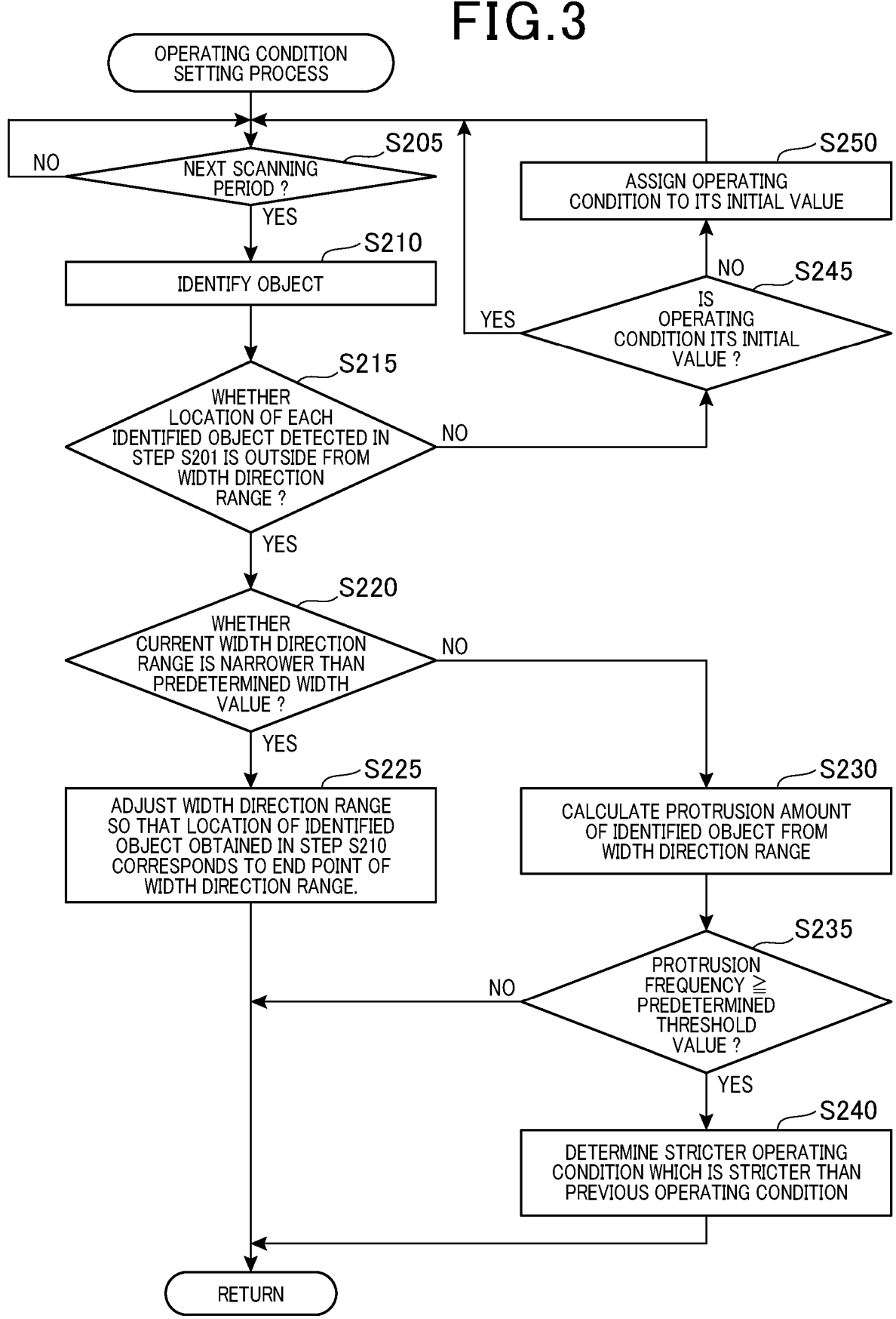
FIG. 3 is a flow chart showing an operating condition setting process performed by the drive assist device shown in FIG. 1.

FIG. 3 is a flow chart showing the operating condition setting process performed by the drive assist device 10 shown in FIG. 1.

The operating condition setting process determines the operation conditions to be used for detecting a state of whether the operation conditions in the safe operation process previously described are satisfied. In more specifically, the operating condition setting process determines the predetermined grace time which is one of the operation conditions. For example, when the predetermined grace time is switched from five seconds to three seconds, this suppresses a degree of execution of the safe operation. Because when the time reaches to the grace time, the collision prediction part 16 detects again whether the own vehicle 500 will collide with the detected other vehicle (see step S140). The shorter the grace time is, the collision prediction part 16 detects whether the own vehicle 500 will collide with the detected other vehicle at a time closer to the estimated collision time. This makes it possible to predict occurrence of collision of the own vehicle 500 with the detected other vehicle with high accuracy. Accordingly, the drive assist device 10 perform no safe operation when the detected other vehicle, as a preceding vehicle travelling ahead of the own vehicle 500, has made a left turn or a right turn, i.e. has departed from the driving lane, on which the own vehicle 500 travels, within the two second period counted from five second before to three second before of the predicted collision time, or when the own vehicle 500 has left, i.e. departed from the driving lane. This allows the drive assist device 10 to avoid an unnecessary safe operation from being performed. This makes it possible to provide comfortable driving to the vehicle driver and the vehicle occupants. Further, this makes it possible to reduce high risk of collision with a following vehicle when the driver of the own vehicle 500 suddenly performs brake operation.

The drive assist device 10 performs the operation condition setting process and the safe operation process simultaneously when the driver turns on the ignition key of the own vehicle 500 and the electric power is supplied to the drive assist device 10.

In step S205 shown in FIG. 3, the detection result acquiring part 11 detects whether a next scanning period has come. This next scanning period will be explained later.

When the detection result in step S205 indicates negative ("NO" in step S205), i.e. indicates that the next scanning period has not come, the detection result acquiring part 11 performs step S205 again. As will be explained later, the drive assist device 10 periodically estimates a width direction range of the detected other vehicle as a preceding vehicle. The detection result acquiring part 11 detects that a timing of the next scanning period has come.

When the detection result in step S205 indicates positive ("YES" in step S205), i.e. indicates that the next scanning period has come, the operation flow progresses to step S210.

In step S210, the detection result acquiring part 11 identifies objects as the detection results transmitted from the millimeter wave radar 25.

In step S215, the condition setting part 13 detects whether the location of each of the identified objects detected in step S210 is outside the width direction range. The condition setting part 13 determines that the identified object is outside the width direction range when performing step S215 at the first time, or until that the locations of the identified objects obtained at different timings in step S210 have different from each other. The width direction range will be changed in step S225.

When the detection result in step S215 indicates positive ("YES" in step S215), i.e. indicates that the identified object is outside the width direction range, the operation flow progresses to step S220.

In step S220, the condition setting part 13 detects whether the current width direction range is narrower than a predetermined width value. This predetermined set value corresponds to a vehicle width of another vehicle determined in advance. The drive assist device 10 according to the exemplary embodiment uses the width direction range of 1.7 meters. It is acceptable for the drive assist device 10 to use another width as the width direction range.

When the detection result in step S220 indicates positive ("YES" in step S220), i.e. indicates that the width direction range is narrower than the predetermined width value, the operation flow progresses to step S225.

In step S225, the condition setting part 13 adjusts the width direction range so that the location of the identified object obtained in step S210 is an end point of the width direction range.

Figure 4:
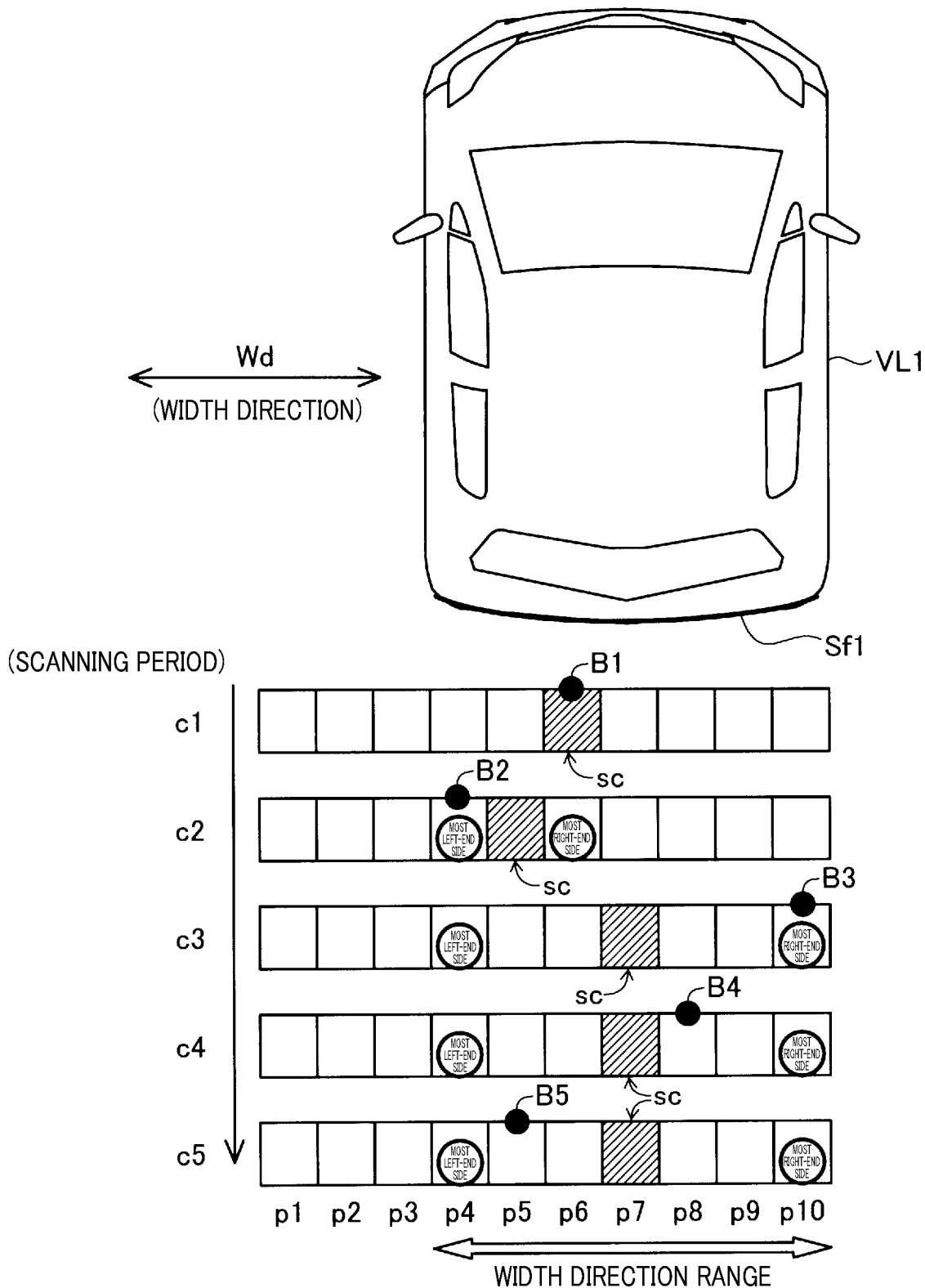
FIG. 4 is a view showing an example of adjusting a width direction range performed by the drive assist device shown in FIG. 1.

FIG. 4 is a view showing an example of adjusting the width direction range performed by the condition setting part 13 in the drive assist device shown in FIG. 1.

As shown in FIG. 4, the objects B1 to B5 have been identified on the basis of reflected waves reflected by the detected other vehicle as the preceding vehicle VL1. That is, FIG. 4 schematically shows the location of each of the identified objects B1 to B5 arranged along the width direction Wd by using the respective positions p1 to p10 which correspond to ten cells. In FIG. 4, the location sc of the detected other vehicle VL is designated by hatched cells in each of the scanning period c1 to the scanning period c5.

The location sc of the detected other vehicle as the preceding vehicle VL1 will be explained in detail later.

In the scanning period c1 shown in FIG. 4, one object B1 only is detected at the position p6. In the scanning period c2, the object c2 is detected at the position p4. Accordingly, in the scanning period c2, because the position p4 of the identified object B2 represents the left-hand end of the width direction range in the width direction Wd, the width direction range is determined in the width direction Wd, from the position p6 as the right-hand end to the position p4 as the left-hand side.

In the scanning period c3 shown in FIG. 4, because the position p10 of the identified object B3 is outside the width direction range determined in the scanning period c2, the width direction range is adjusted. Specifically, the width direction range is adjusted from the position p10 as the right-hand end to the position p4 as the left-hand side. That is, in the scanning period c3, the width direction range is from the position p10 to the position p4. In the case shown in FIG. 4, because the length of the seven cells (for example, the cells p4 to p10) is the predetermined width value of 1.7 meters, the width direction range becomes equal to the predetermined width value in the scanning period c3.

In step S215 shown in FIG. 3, when the detection result in step S215 indicates negative ("NO" in step S215), i.e. indicates that the identified object is located within the width direction range, the operation flow progresses to step S245.

In step S245, the condition setting part 13 detects whether the grace time as one of the operating conditions is still the initial value thereof. This means that the grace time is the initial value of five seconds. This operating condition is switched to another value from its initial value in step S240. The process in step S240 will be explained later.

When the detection result in step S245 indicates positive ("YES" in step S240), i.e. indicates that the operating condition as the grace time is still the initial value, the operation flow returns to step S205 shown in FIG. 3. In this case, because the drive assist device 10 does not perform step S225, the width direction range is not adjusted.

In the scanning period c4 shown in FIG. 4, because the position p8 of the identified object B4 is inside of the width direction range of the position p4 to the position p10 which has been determined in the scanning period c3 previously before the scanning period c4, the width direction range is not changed. That is, the width direction range of the position p4 to the position p10 is maintained.

Similarly, because the position p5 of the identified object B5 is inside of the width direction range of the position p4 to the position p10 which has been determined in the scanning period c3 previously before the scanning period c5 and the scanning period c4, the width direction range is not changed. That is, the width direction range of the position p4 to the position p10 is maintained.

In step S220, when the detection result in step S220 indicates negative ("NO" in step S220), i.e. indicates that the width direction range is not less than the predetermined width value, the operation flow progresses to step S230.

In step S230, the condition setting part 13 calculates a protrusion frequency of the identified object from the width direction range. In the example shown in FIG. 4, when the identified object has the position p1, p2 and p3 in a scanning period after the scanning period c5, because the width direction range has reached the predetermined width value and the position of the identified objects outside the width direction range, the operation flow progresses to step S230.

When the position of the identified object is outside the width direction range so long as the width direction range has reached the predetermined width value, possible reasons are as follows, for example:

The own vehicle 500 or the detected other vehicle has departed from the driving lane when the own vehicle 500 or the detected other vehicle has made a left turn or a right turn, and the own vehicle 500 or the detected other vehicle waves.

A protrusion frequency represents a ratio of frequency of when the position of the identified object is outside the width direction range in a previously predetermined scanning period, i.e. a ratio of the frequency of when the position of the identified object is outside the width direction range to the total number of the scanning periods.

In step S235, the condition setting part 13 detects whether the protrusion frequency calculated in step S230 is not less than a predetermined threshold value. The drive assist device 10 according to the exemplary embodiment uses the predetermined threshold value of 50%. It is acceptable to use another threshold value instead of the predetermined threshold value of 50%. For example, it is possible to use a predetermined threshold value of 0%. When using the predetermined threshold value of 0%, it is possible for the drive assist device 10 to avoid step S230 and step S235 from the flow chart shown in FIG. 3. That is, it is acceptable for the drive assist device 10 to perform step S240 without step S230 and step S235 when the detection result in step S215 indicates positive ("YES" in step S215), i.e. indicates that the position of the identified object is outside the width direction range and the detection result in step S220 indicates negative ("NO" in step S220), i.e. indicates that the width direction range is not narrower than the predetermined width value.

When the detection result in step S235 indicates negative ("NO" in step S235), i.e. indicates that the protrusion frequency calculated in step S230 is less than the predetermined threshold value, the operation flow returns to step S105.

On the other hand, when the detection result in step S235 indicates positive ("YES" in step S235), i.e. indicates that the protrusion frequency calculated in step S230 is not less than the predetermined threshold value, the operation flow returns to step S240.

In step S240, the condition setting part 13 determines and uses a stricter operating condition which is stricter than the previous operating condition. Specifically, the condition setting part 13 uses another grace time of three seconds instead of five seconds.

As previously described, the protrusion frequency indicates the ratio of frequency of when the position of the identified object is outside the width direction range in the previously predetermined scanning period, i.e. the ratio of the frequency of when the position of the identified object is outside the width direction range to the total number of the scanning periods.

When the protrusion frequency counted during the previous predetermined scanning range is not less than the predetermined threshold value, there is a high probability of the detected other vehicle traveling ahead of the own vehicle 500 having departed from the driving lane of the own vehicle 500. This case makes it possible to suppress the degree of execution of the safe operation, i.e. to avoid an unnecessary safe operation by using a short grace time of three seconds. Specifically, when the detected other vehicle or the own vehicle 500 has made a right turn or a left turn to enter a branch road and departed from the driving lane after step S240 and the detection result in step S140 provides a prediction result which indicates no occurrence of collision, this makes it possible to avoid the degree of execution of an unnecessary safe operation.

The detection result in step S245 indicates negative ("NO" in step S245), i.e. indicates that the operating condition is different from its initial value, the operation flow progresses to step S250.

In step S250, the condition setting part 13 assigns the operating condition to its initial value.

In a case of when the predetermined grace time as the operating condition is switched to three seconds, this suppresses the degree of execution of the safe operation in step S240, or in a case of when the detected other vehicle or the own vehicle 500 has made a right turn or a left turn and has departed from the driving lane, or a case of when the safe operation is executed, it is desirable to assign the grace time as the operating condition to its initial value. When a newly identified object is present within the width direction range, it is estimated that the newly identified object corresponds to a newly detected vehicle, and the condition setting part 13 switches the operating condition to its initial value.

A description will now be given of the process of identifying the moving vector of the detected other vehicle in step S105 and step S130 in the safe operation process with reference to FIG. 2 and FIG. 4.

As shown in FIG. 4, when the operation condition setting process estimates the width direction range, the position sc of the detected other vehicle is identified as the position of the preceding vehicle VL1. The position sc of the detected other vehicle corresponds to a center position in the width direction range along the width direction Wd. Accordingly, the central position p5 in the width direction range from the position p4 to the position p6 is identified as the position sc of the detected other vehicle during the scanning period c2 (see FIG. 4.)

Similarly, the central position p7 in the width direction range from the position p4 to the position p0 is identified as the position sc of the detected other vehicle during the scanning period c3, the scanning period c4 and the scanning period c5 (see FIG. 4.)

The moving vector of the detected other vehicle is determined on the basis of the position sc of the detected other vehicle during a plurality of scanning periods by using the least squares method and a RANdom SAmple Consensus (RANSAC) method.

As previously described in detail, according to the drive assist device 10 according to the exemplary embodiment, the condition setting part 13 determines and uses a stricter operating condition (for example, a shorter grace time) which is stricter than the previous operating condition when the position of the identified object obtained on the basis of detection results of the millimeter wave radar 25 is outside the width direction range which has been estimated.

The use of this stricter operating condition suppresses the degree of execution of the safe operation, and provides an optimum operating condition of the safe operation when the drive assist device 10 detects another vehicle on the basis of detection results transmitted from the millimeter wave radar 25. There is a high probability of the detected other vehicle traveling ahead of the own vehicle 500 having departed from the driving lane of the own vehicle 500 or the detected other vehicle or the own vehicle 500 having made a right turn or a left turn when the position of the detected object is outside the width direction range which has been estimated. In this case, the condition setting part 13 uses a stricter operating condition so as to suppress the degree of execution of the safe operation. This makes it possible to avoid an unnecessary safe operation from being performed. Accordingly, the drive assist device 10 according to the exemplary embodiment having the structure previously described makes it possible to generate and use the optimum operating condition for the safe operation of the own vehicle 500.

Further, the drive assist device 10 according to the exemplary embodiment estimates the width direction range by using variation in the width direction of position information of objects identified in time series on the basis of the detection results transmitted from the millimeter wave radar 25. This structure of the drive assist device 10 makes it possible to determine the optimum operating condition of the safe operation even if variation occurs in the position of the objects identified by the millimeter wave radar 25.

The drive assist device 10 according to the exemplary embodiment estimates, as the width direction range, a position range from an identified object located at one end-most position and an identified object located at the other end-most position in a plurality of objects detected in time series in the width direction. This makes it possible to estimate the width direction range with high accuracy. Because variation of the position of the identified objects in the width direction often occurs within the width direction of the other vehicle traveling ahead of the own vehicle 500, the drive assist device 10 according to the exemplary embodiment can estimate the width direction range with high accuracy.

When the position of the identified object is arranged within the width direction range, which has been estimated in the previous scanning period, or when the magnitude of the estimated width direction range is not less than the predetermined width value, the drive assist device 10 according to the exemplary embodiment does not adjust the width direction range. This makes it possible to suppress occurrence of incorrect estimation of the width direction range which is estimated on the basis of the reflection waves transmitted from another object which is different from the detected other vehicle.

Further, because the drive assist device 10 according to the exemplary embodiment identifies the moving vector and the movement locus of the detected other vehicle on the basis of the central position in the width direction range estimated in each scanning period as the position of the detected other vehicle, the drive assist device 10 estimates a collision time of the own vehicle 500 with the detected other vehicle with high accuracy on the basis of the identified movement locus of the detected other vehicle.

Further, the condition setting part 13 reduces the grace time as the operating condition when the position of the detected other vehicle, detected by the sensor, for example, the millimeter wave radar 25 after the width direction range has been estimated, has departed from the estimated width direction range, rather than the grace time as compared with a case in which the when the position of the detected other vehicle is present within the estimated width direction range. This makes it possible for the drive assist device 10 to reduce the grace time as the operating condition when the detected other vehicle or the own vehicle 500 performs a driving lane change or switches to the right lane or the left lane, for example. Further, this makes it possible to suppress the degree of execution of an unnecessary safe operation.

OTHER MODIFICATIONS

First Modification

As previously described, the drive assist device 10 according to the exemplary embodiment uses the millimeter wave radar 25 capable of transmitting radar waves, and detects and identifies objects on the basis of reflection radar waves reflected by the detected other vehicle, and performs the safe operation process and the operating condition setting process on the basis of the identified objects. However, the concept of the present disclosure is not limited by this. For example, it is possible to use another sensor instead of using the millimeter wave radar 25 or to use another sensor in addition to the millimeter wave radar 25. In this modification, it is possible for the drive assist device 10 to perform the safe operation process and the operating condition setting process on the basis of detection results thereof. For example, it is possible for the drive assist device 10 to use the imaging camera 24 instead of the millimeter wave radar 25, and to perform the safe operation process and the operating condition setting process on the basis of detection results (captured image data) of the imaging camera 24. There is a risk in which the drive assist device 10 causes incorrect detection in which the detected other vehicle has departed from the driving lane although the detected other vehicle travels forward in straight direction when a direction of reflection light is changed due to the movement of the detected other vehicle. It is possible for the drive assist device 10 according to the first modification to solve such problems, and to have the same effects of the drive assist device 10 according to the exemplary embodiment.

It is acceptable for the drive assist device 10 to identify a position and a size of the surface of the detected other vehicle on the basis of the captured image data obtained every scanning period in the safe operation process, and to calculate the moving vector of the detected other vehicle on the basis of the identified position and size of the detected other vehicle, and to estimate the movement locus of the detected other vehicle.

In step S251 in the operating condition setting process shown in FIG. 3, the drive assist device 10 detects whether the position of the detected other vehicle obtained based on the image data captured in each scanning period is outside the width direction range which has been identified in a previous scanning period. For example, at this detection time, it is acceptable for the drive assist device 10 to detect whether each of the left-hand end part and the right-hand side part of the detected other vehicle as a preceding vehicle ahead of the own vehicle 500 is present within the width direction range in the captured image data obtained every scanning period.

Further, it is acceptable for the drive assist device 10 to identify, as the width direction range, a width direction range of the detected other vehicle in each captured image data after identifying the detected other vehicle in the captured image data every scanning period.

Still further, it is acceptable for the drive assist device 10 to use a Light Detection And ranging (LiDAR) or a laser Imaging Detection And Ranging device in addition to the imaging camera 24 and the millimeter wave radar 25 or instead of using the imaging camera 24 and the millimeter wave radar 25.

Second Modification

In the drive assist device 10 according to the exemplary embodiment previously described, the condition setting part 13 performs step S230 to calculate the protrusion frequency of the identified object from the width direction range when the estimated width direction range is not less than the predetermined width value. In this case, the condition setting part 13 further performs step S235 of detecting whether the protrusion frequency calculated in step S230 is not less than the predetermined threshold value (for example, 50%), and further performs step S240 in which the condition setting part 13 determines and uses a stricter operating condition which is stricter than the previous operating condition.

However, the concept of the present disclosure is not limited by this. For example, it is possible for the condition setting part 13 to avoid the execution of step S220 without using predetermined width value. In this modification, the condition setting part 13 performs step S230 without performing step S220, i.e. performs step S230 immediately after step S215 without calculating the protrusion frequency of the identified object. When the protrusion frequency calculated in step S230 is not less than the predetermined threshold value, the condition setting part 13 performs step S240. In this case, it is possible for the condition setting part 13 to perform step S224 shown in FIG. 3 so as to adjust, i.e. update the width direction range when the protrusion frequency calculated in step S230 is less than the predetermined threshold value.

Third Modification

As previously described, the drive assist device 10 according to the exemplary embodiment identifies one object on the basis of the reflected waves reflected by the detected other vehicle.

However, the concept of the present disclosure is not limited by this. For example, it is possible to detect a plurality of objects on the basis of reflected waves. In this structure, it is acceptable for the condition setting part 13 in the drive assist device 10 to perform step S215 to step S250 in the operating condition setting process shown in FIG. 3 every identified object. For example, in step S215, the condition setting part 13 detects whether each of the identified object positioned at the most right-end side and the identified object positioned at the most left-end side is outside the width direction range. When the detection result indicates that one of them is outside the width direction range, it is acceptable for the condition setting part 13 to perform step S225 to step S250.

Fourth Modification

In the drive assist device 10 according to the exemplary embodiment previously described, the condition setting part 13 determines a shorter grace time as a stricter operating condition in step S240. However, the concept of the present disclosure is not limited by this. It is possible for the condition setting part 13 to use one or more additional operating conditions in addition to the operating condition so as to provide stricter operating conditions. For example, when using the operating condition that a specific time has elapsed in the predetermined grace time of the estimated collision time, it is possible for the condition setting part 13 to use an additional operating condition that a speed of the own vehicle 500 is not less than a predetermined speed value. For example, it is possible for the condition setting part 13 to use the predetermined speed value of 30 km/h or another speed value.

In addition, when using the operating condition that a specific time has elapsed in the predetermined grace time of the estimated collision time, it is possible for the condition setting part 13 to use an additional operating condition that a variation of the width direction of the detected other vehicle in the image data captured by the imaging camera 24 is not more than a predetermined value.

When the detected other vehicle as a preceding vehicle or the own vehicle 500 has made a left turn or a right turn, i.e. has departed from the driving lane, a variable amount of the width direction range of the detected other vehicle temporarily increases in the captured image data. In this case, it is possible for the drive assist device 10 to perform the necessary safe operation by using the additional operating condition previously explained when the detected other vehicle does not depart from the driving lane and continuously travels ahead of the own vehicle 500.

It is acceptable for the condition setting part 13 to use another operating condition instead of the grace time so as to adjust a degree of the operating condition of the drive assist device. For example, the condition setting part 13 increases the degree of the operating condition by more reducing the width of the own vehicle 500 which is compared with the movement locus of the detected other vehicle during the collision prediction process in step S140. Specifically, in the collision prediction process in step S140, the drive assist device 10 predicts occurrence of collision with the detected other vehicle when the movement locus of the detected other vehicle is overlapped with a narrow range near the front central part of the own vehicle 500.

When the initial value of the operating condition is 1.7 meters near the central part of the own vehicle 500, it is acceptable for the condition setting part 13 to use the range to 1.0 meters, instead of 1.7 meters near the central part of the own vehicle 500. This makes it possible for the drive assist device 10 to suppress the degree of execution of the safe operation because the probability of collision of the own vehicle 500 with the detected other vehicle can be reduced.

Fifth Modification

It is acceptable to use software programs so as to realize a part of functions of hardware elements used in each drive assist device 10 according to each of the exemplary embodiment and the first to fourth modifications thereof.

Further, it is acceptable to use hardware elements so as to realize a part of functions of software programs used in each drive assist device 10 according to each of the exemplary embodiment and the first to fourth modifications thereof. For example, it is acceptable to use one or modules composed of integrated circuits, discrete semiconductor circuits and a combination thereof so as to realize at least one of the functional parts composed of the detection result acquiring part 11, the range estimation part 12, the condition setting part 13, the collision time estimation part 14, the safe operation control part 15 and the collision prediction part 16.

It is possible to provide a non-transitory computer readable storage medium for storing software programs (or computer programs) so as to realize the overall or a part of the functions of the drive assist device 10 according to the exemplary embodiments and various modifications. There are various types of non-transitory computer readable storage mediums, portable memory mediums such as flexible discs, compact disc read only memory (CD-ROM), a memory device in a computer such as a random access memory (RAM), a read only memory (ROM), etc., and a hard disk device as an external memory device mounted on a computer system. That is, the non-transitory computer readable storage medium represents various types of computer readable storage medium.

Incidentally, there often happens a possible case in which the position of objects identified on the basis of reflected waves varies even though no relative position of the own vehicle with respect to the other vehicle is changed, where the reflected waves have been transmitted toward another vehicle, travelling ahead of the own vehicle on the driving lane, from the sensors such as the millimeter wave radar 25 and reflected by another vehicle. Specifically, for example, there is a possible case in which a position in the vehicular width direction (the width direction in short) of another vehicle is changed even though another vehicle travels straight on the driving lane. This phenomenon often occurs when another vehicle is not moving in a straight line on the driving lane. Rocking of another vehicle occurs due to a vehicle pitch phenomenon, and reflection points on another vehicle at which transmitted waves are reflected are thereby varied.

When those variation of the position of the identified object moves, for example, from the left-hand side to the right-hand side in time series along the width direction in the captured image data, an incorrect recognition occurs, in which another vehicle is incorrectly judged to have made a right turn, a left turn, or a lane change. Occurrence of such incorrect recognition often prevents generation of an optimum operating condition to perform the safe operation. For example, there is a situation in which when the operating condition is used for detecting whether a grace time has elapsed in the estimated collision time, and this grace time has two different values, one is used when another vehicle is travelling on a driving lane, and the other is used when another vehicle is departing from the driving lane. In this situation, when incorrect recognition in which another vehicle is departing from the driving lane has occurred, it becomes difficult to determine optimum grace time as the operating condition so as to trigger braking force at a correct timing.

Such a problem also occurs in various safe operations, for example, safe operation of performing automatic steering operation, safe operation of performing automatic seatbelt rolling-up operation so as to avoid collision of the own vehicle with another vehicle, and to suppress collision damage. Further, such a problem also occurs when the drive assist device uses various types of sensors such as a Light Detection And ranging (LiDAR), or an imaging camera in addition to a millimeter wave radar. That is, there has been a strong technical demand to determine appropriate vehicle safe operating conditions.

As previously described in detail, the exemplary embodiment and the modifications thereof according to the present disclosure can solve such problems. In the drive assist device 10 according to the exemplary embodiment, the condition setting part 13 determines and uses a stricter operating condition (for example, a shorter grace time) which is stricter than the previous operating condition when the position of the identified object obtained on the basis of detection results of the millimeter wave radar 25 is outside the width direction range which has been estimated.

The use of this stricter operating condition suppresses the degree of execution of the safe operation provides an optimum operating condition of the safe operation when the drive assist device 10 detects another vehicle on the basis of detection results transmitted from the millimeter wave radar 25. There is a high probability in which the detected other vehicle traveling ahead of the own vehicle 500 has departed from the driving lane of the own vehicle 500 or the detected other vehicle or the own vehicle 500 has made a right turn or a left turn when the position of the detected object is outside the width direction range which has been estimated. In this case, the condition setting part 13 uses a stricter operating condition so as to suppress the degree of execution of the safe operation. This makes it possible to avoid an unnecessary safe operation from being performed.

Accordingly, the drive assist device 10 according to the exemplary embodiment having the structure previously described makes it possible to generate and use the optimum operating condition for the safe operation of the own vehicle 500.

While specific embodiments of the present disclosure have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present disclosure which is to be given the full breadth of the following claims and all equivalents thereof.

What is claimed is:

1. A drive assist device to be mounted on an own vehicle comprising:
   a computer system including a central processing unit, the computer system being configured to provide:
   a detection result acquiring part configured to acquire detection results of a sensor which detects a presence of an other vehicle travelling ahead of the own vehicle on a driving lane;
   a range estimation part configured to estimate a width direction range of a surface of the other vehicle, which faces the own vehicle side on the basis of the acquired detection results of the sensor;
   a safe operation control part configured to perform safe operation of the own vehicle of at least one of avoiding occurrence of collision with the other vehicle and of reducing collision damage when a predetermined operating condition is satisfied; and
   a condition setting part configured to adjust the predetermined operating condition to another operating condition which is stricter than the predetermined operating condition so as to suppress an execution of the safe operation of the own vehicle when a position of the other vehicle detected by the sensor is outside the width direction range after the width direction range has been estimated, as compared with a condition of the execution of the safe operation of the own vehicle when the position of the other vehicle detected by the sensor is within the width direction range.

2. The drive assist device to be mounted on the own vehicle according to claim 1, wherein the sensor comprises a millimeter wave radar, and the range estimation part estimates the width direction range on the basis of a variation of the detection results of the millimeter wave radar in the width direction of objects identified in time series.

3. The drive assist device to be mounted on the own vehicle according to claim 2, wherein the range estimation part estimates, as the width direction range designated as an area between an identified object located at one most-end side in the width direction and an identified object located at the other most-end side in the width direction, among the identified objects identified in time-series by the sensor.

4. The drive assist device to be mounted on the own vehicle according to claim 3, wherein
   the range estimation part identifies objects for each predetermined scanning period, and adjusts the width direction range so that an end of the width direction range corresponds to a location of the object identified every predetermined scanning period when the object identified every predetermined scanning period is outside the width direction range previously estimated and when a size of the width direction range previously estimated is smaller than a predetermined width value, and
   the range estimation part maintains the width direction range previously estimated when the object identified in each predetermined scanning period is within the width direction range previously estimated and when the size of the width direction range previously estimated is not less than the predetermined width direction range of a width of the own vehicle.

5. The drive assist device to be mounted on the own vehicle according to claim 4, wherein
when detecting and identifying a plurality of objects comprising a first identified object located at one end most side and a second identified object located at the other end-most side every predetermined scanning period, the range estimation part detects whether each of the first identified object and the second identified object is outside the width direction range previously estimated, and
the range estimation part is configured to adjust the width direction range so that the position of the first identified object and the position of the second identified object are positioned at the end parts of the range estimation part when each of the first identified object and the second identified object is outside the width direction range previously estimated, and when the width direction range previously estimated is narrower than the predetermined width value.

6. The drive assist device to be mounted on the own vehicle according to claim 3, further comprising:
a collision prediction part is configured to identify and determine a movement locus of the other vehicle corresponding to the position of the other vehicle as the central position of the width direction range estimated every scanning period, and
a collision time estimation part configured to estimate a collision time of the own vehicle with the other vehicle,
wherein the operating condition includes a condition of whether a predetermined grace time has elapsed in the estimated collision time, and
the condition setting part reduces the predetermined grace time when the position of the other vehicle detected by the sensor is outside the width direction range after the width direction range has been estimated, as compared with the width direction range which is used when the position of the other vehicle detected by the sensor is within the width direction range.

7. The drive assist device to be mounted on the own vehicle according to claim 4, further comprising:
a collision prediction part is configured to identify and determine a movement locus of the other vehicle corresponding to the position of the other vehicle as the central position of the width direction range estimated every scanning period, and
a collision time estimation part configured to estimate a collision time of the own vehicle with the other vehicle,
wherein the operating condition includes a condition of whether a predetermined grace time has elapsed in the estimated collision time, and
the condition setting part reduces the predetermined grace time when the position of the other vehicle detected by the sensor is outside the width direction range after the width direction range has been estimated, as compared with the width direction range which is used when the position of the other vehicle detected by the sensor is within the width direction range.

8. The drive assist device to be mounted on the own vehicle according to claim 5, further comprising:
a collision prediction part is configured to identify and determine a movement locus of the other vehicle corresponding to the position of the other vehicle as the central position of the width direction range estimated every scanning period, and
a collision time estimation part configured to estimate a collision time of the own vehicle with the other vehicle,
wherein the operating condition includes a condition of whether a predetermined grace time has elapsed in the estimated collision time, and
the condition setting part reduces the predetermined grace time when the position of the other vehicle detected by the sensor is outside the width direction range after the width direction range has been estimated, as compared with the width direction range which is used when the position of the other vehicle detected by the sensor is within the width direction range.

9. A drive assist method comprising steps of:
acquiring detection results of a sensor which detects a presence of other vehicle travelling ahead of an own vehicle on a driving lane;
estimating a width direction range of a surface of the other vehicle, which faces the own vehicle side on the basis of the acquired detection results of the sensor;
performing safe operation of the own vehicle of at least one of avoiding occurrence of collision with the other vehicle and of reducing collision damage when a predetermined operating condition is satisfied; and
adjusting the predetermined operating condition to another operating condition which is stricter than the predetermined operating condition so as to suppress an execution of the safe operation of the own vehicle when a position of the other vehicle detected by the sensor is outside the width direction range after the width direction range has been estimated, as compared with a condition of the execution of the safe operation of the own vehicle when the position of the other vehicle detected by the sensor is within the width direction range.

10. A non-transitory computer readable medium storing a program causing a computer to execute a drive assist process, the drive assist process comprising:
acquiring part acquiring detection results of a sensor which detects a presence of other vehicle travelling ahead of an own vehicle on a driving lane;
estimating a width direction range of a surface of the other vehicle, which faces the own vehicle side on the basis of the acquired detection results of the sensor;
performing safe operation of the own vehicle of at least one of avoiding occurrence of collision with the other vehicle and of reducing collision damage when a predetermined operating condition is satisfied; and
adjusting the predetermined operating condition to another operating condition which is stricter than the predetermined operating condition so as to suppress an execution of the safe operation of the own vehicle when a position of the other vehicle detected by the sensor is outside the width direction range after the width direction range has been estimated, as compared with a condition of the execution of the safe operation of the own vehicle when the position of the other vehicle detected by the sensor is within the width direction range.

* * * * *